(12) United States Patent
Vaidyanathan et al.

(10) Patent No.: US 11,521,256 B2
(45) Date of Patent: Dec. 6, 2022

(54) AUTOMATICALLY GENERATING PERSONALIZED FLAVOR PREFERENCES

(71) Applicant: Walmart Apollo, LLC, Bentonville, AR (US)

(72) Inventors: Vivek Vaidyanathan, Sunnyvale, CA (US); Aysenur Inan, Mountain View, CA (US); Venugopal Mani, Sunnyvale, CA (US); Hyun Duk Cho, San Francisco, CA (US); Yogananth Mahalingam, Fremont, CA (US); Sushant Kumar, Sunnyvale, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/163,474

(22) Filed: Jan. 31, 2021

(65) Prior Publication Data

US 2022/0245708 A1 Aug. 4, 2022

(51) Int. Cl.
*G06Q 30/00* (2012.01)
*G06Q 30/06* (2012.01)
(Continued)

(52) U.S. Cl.
CPC ....... *G06Q 30/0631* (2013.01); *G06F 40/284* (2020.01); *G06K 9/623* (2013.01);
(Continued)

(58) Field of Classification Search
None
See application file for complete search history.

(56) References Cited

U.S. PATENT DOCUMENTS 7,013,290 B2 3/2006 Ananian
8,843,497 B2 9/2014 Stankiewicz et al.
(Continued)

FOREIGN PATENT DOCUMENTS

WO WO-2014011464 A4 * 1/2014 ............... G06N 5/02
WO WO-2019011431 A1 * 1/2019 ......... G06Q 30/0201
(Continued)

OTHER PUBLICATIONS

Paula R Trumbo et al. "Perspective: Measuring Sweetness in Foods, Beverages, and Diets: Toward Understanding the Role of Sweetness in Health" Advances in Nutrition, vol. 12, Issue 2, Mar. 2021, pp. 343-354, https://doi.org/10.1093/advances/nmaa151 (Year: 2021).*

*Primary Examiner* — Naeem U Haq
(74) *Attorney, Agent, or Firm* — Bryan Cave Leighton Paisner LLP (57) ABSTRACT

A system including one or more processors and one or more non-transitory computer-readable media storing computing instructions configured to run on the one or more processors and perform creating a standardized flavor list from flavors associated with items in a catalog; determining a respective score indicating a degree of affinity for a user for each flavor of each of one or more item types associated with the items; creating a respective ordered list of flavors for each of the one or more item types for the user in which the respective ordered list of flavors are ranked by the respective score for the each flavor in the ordered list; and re-ranking a non-personalized list of recommended items associated with an anchor item of the items using the respective ordered list of flavors for the user. Other embodiments are disclosed.

20 Claims, 6 Drawing Sheets

405

501 – Extracting flavor attribute values associated with the items in the catalog 502 – Normalizing non-standard words used in the flavor attribute values 503 – Stemming words used in the normalized flavor list to create a stemmed flavor list 504 – Scrubbing category metadata from the stemmed flavor list 505 – Adding flavors having a frequency of at least a first predetermined threshold (51) Int. Cl.
  *G06N 7/00*       (2006.01)
  *G06K 9/62*       (2022.01)
  *G06F 40/284*     (2020.01)

(52) U.S. Cl.
  CPC .......... *G06K 9/6223* (2013.01); *G06N 7/005* (2013.01); *G06Q 30/0621* (2013.01)

(56) References Cited

U.S. PATENT DOCUMENTS

| | | | |
|---|---|---|---|
| 9,633,456 B2 * | 4/2017 | Wolfe .................. | G06T 11/206 |
| 10,592,959 B2 | 3/2020 | Wilkinson et al. | |
| 2007/0157797 A1 * | 7/2007 | Hashizume .............. | G10H 1/00 |
| | | | 84/609 |
| 2012/0226698 A1 * | 9/2012 | Silvestre ................ | G06Q 30/02 |
| | | | 707/E17.084 |
| 2013/0222406 A1 * | 8/2013 | Wolfe ................ | G06Q 30/0241 |
| | | | 345/582 |
| 2014/0025532 A1 * | 1/2014 | Huang ............... | G06Q 30/0631 |
| | | | 705/26.7 |

FOREIGN PATENT DOCUMENTS

| | | | | |
|---|---|---|---|---|
| WO | WO-2020186114 A1 * | 9/2020 | ......... | G06K 9/00456 |
| WO | WO-2021138451 A1 * | 7/2021 | | |

* cited by examiner

AUTOMATICALLY GENERATING PERSONALIZED FLAVOR PREFERENCES

TECHNICAL FIELD

This disclosure relates generally relates to automatically generating personalized flavor preferences.

BACKGROUND

Users of online shopping systems often rely on item attribute information when deciding whether to order an item. For example, item attribute information for an item can include a flavor attribute, which can list one or more flavors associated with the item. Items sold online often have incorrect or missing attributes, such as flavor attributes, which can make it difficult for users to ascertain relevant information about the items.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 1:
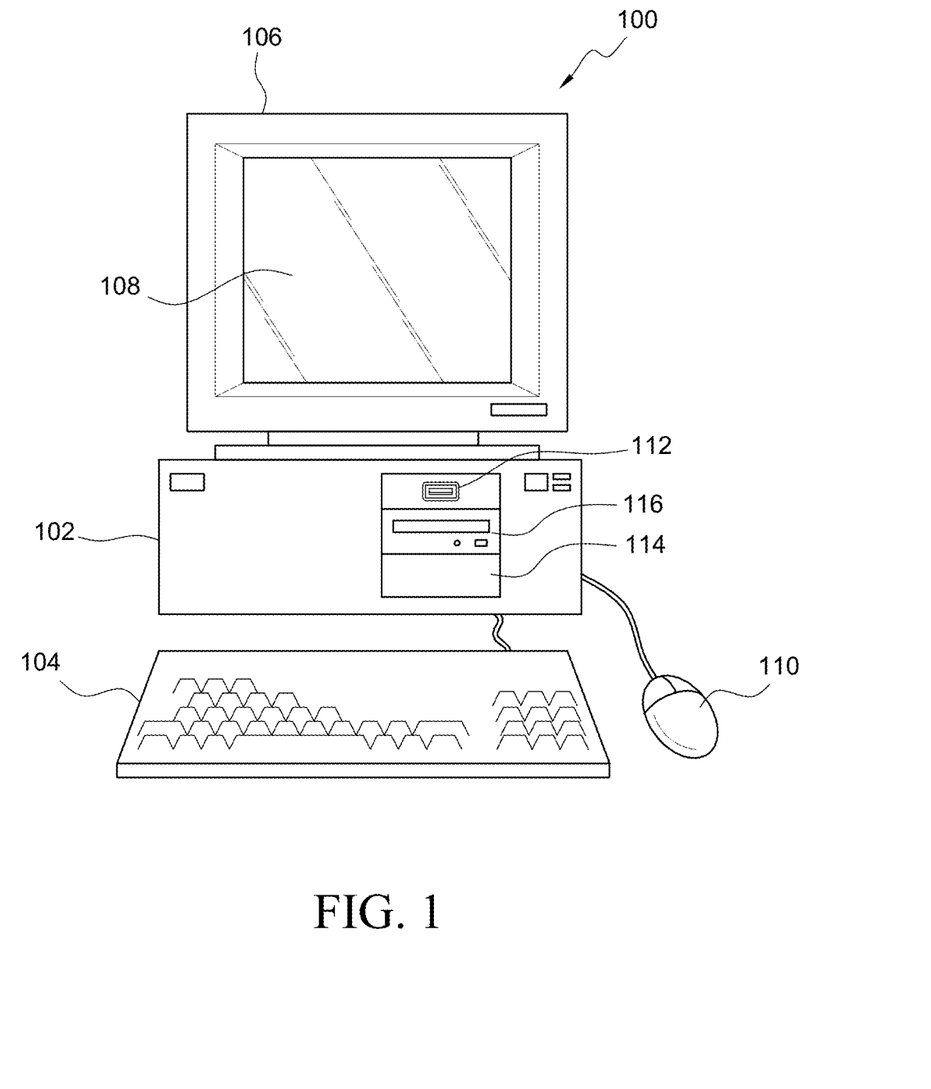
FIG. 1 illustrates a front elevational view of a computer system that is suitable for implementing an embodiment of the system disclosed in FIG. 3.
Figure 2:
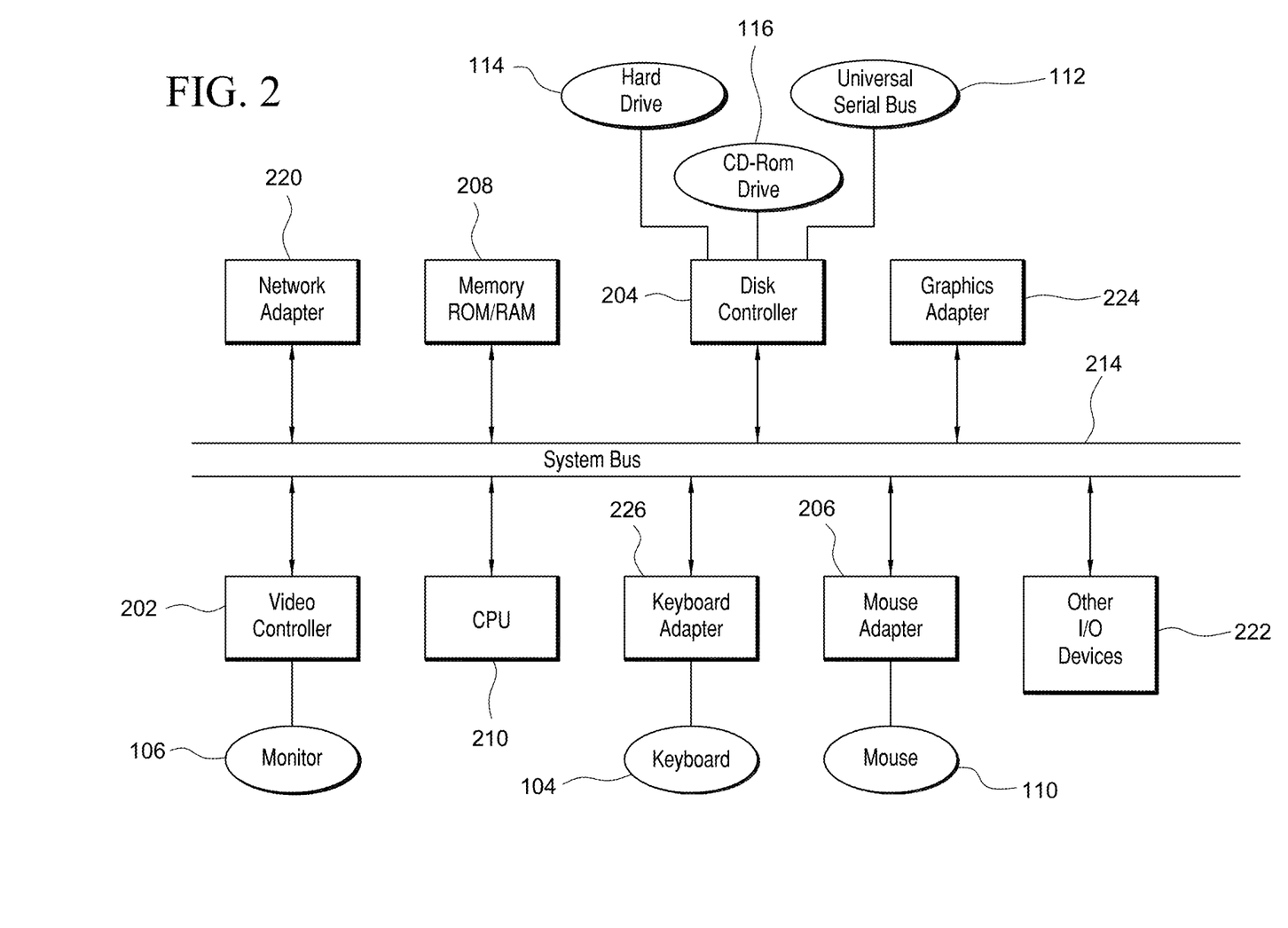
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
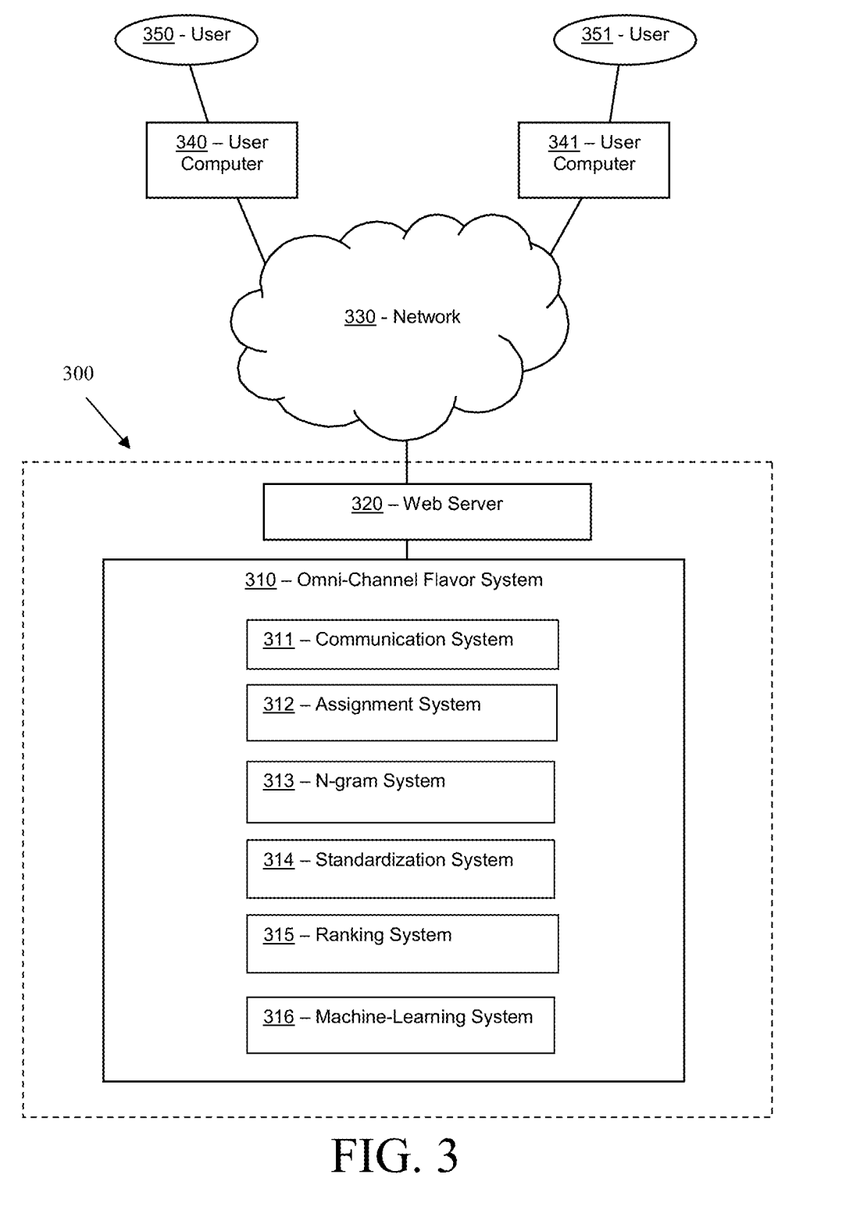
FIG. 3 illustrates a block diagram of a system that can be employed for an automatically generating personalized flavor preferences, according to an embodiment.

Turning ahead in the drawings, FIG. 3 illustrates a block diagram of a system 300 that can be employed for automatically generating flavor preferences, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include an omni-channel flavor system 310 and/or a web server 320. Omni-channel flavor system 310 can be a computer system, such as computer system 100 (FIG. 1), as described above, and can each be a single computer, a single server, or a cluster or collection of computers or servers, or a cloud of computers or servers. In another embodiment, a single computer system can host two or more of, or all of, omni-channel flavor system 310 and/or web server 320. Additional details regarding omni-channel flavor system 310 and/or web server 320 are described herein.

In a number of embodiments, each of omni-channel flavor system 310 can be a special-purpose computer programed specifically to perform specific functions not associated with a general-purpose computer, as described in greater detail below.

In some embodiments, web server 320 can be in data communication through network 330 with one or more user computers, such as user computers 340 and/or 341. Network 330 can be a public network, a private network or a hybrid network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between omni-channel flavor system 310 and/or web server 320 within system 300. Accordingly, in some embodiments, omni-channel flavor system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

In some embodiments, omni-channel flavor system 310 can be a distributed system that includes one or more systems. In other embodiments, omni-channel flavor system 310 can be a centralized system that communicates with computer systems. In some embodiments, network 330 can be an internal network that is not open to the public, which can be used for communications between omni-channel flavor system 310 and user computers 340-341 (FIG. 3). In other embodiments, network 330 can be a public network, such as the Internet. In several embodiments, operators and/or administrators of omni-channel flavor system 310 can manage omni-channel flavor system 310, the processor(s) of system 300, and/or the memory storage unit(s) of omni-channel flavor system 310 using the input device(s) and/or display device(s) of omni-channel flavor system 310, or portions thereof in each case.

In several embodiments, omni-channel flavor system 310 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to omni-channel flavor system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of omni-channel flavor system 310. In a similar manner, the processors and/or the non-transitory computer-readable media can be local and/or remote to each other.

Meanwhile, in many embodiments, omni-channel flavor system 310 also can be configured to communicate with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between omni-channel flavor system 310, web server 320, and/or the one or more databases can be implemented using any suitable manner of wired and/or wireless communication. Accordingly, omni-channel flavor system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Figure 4:
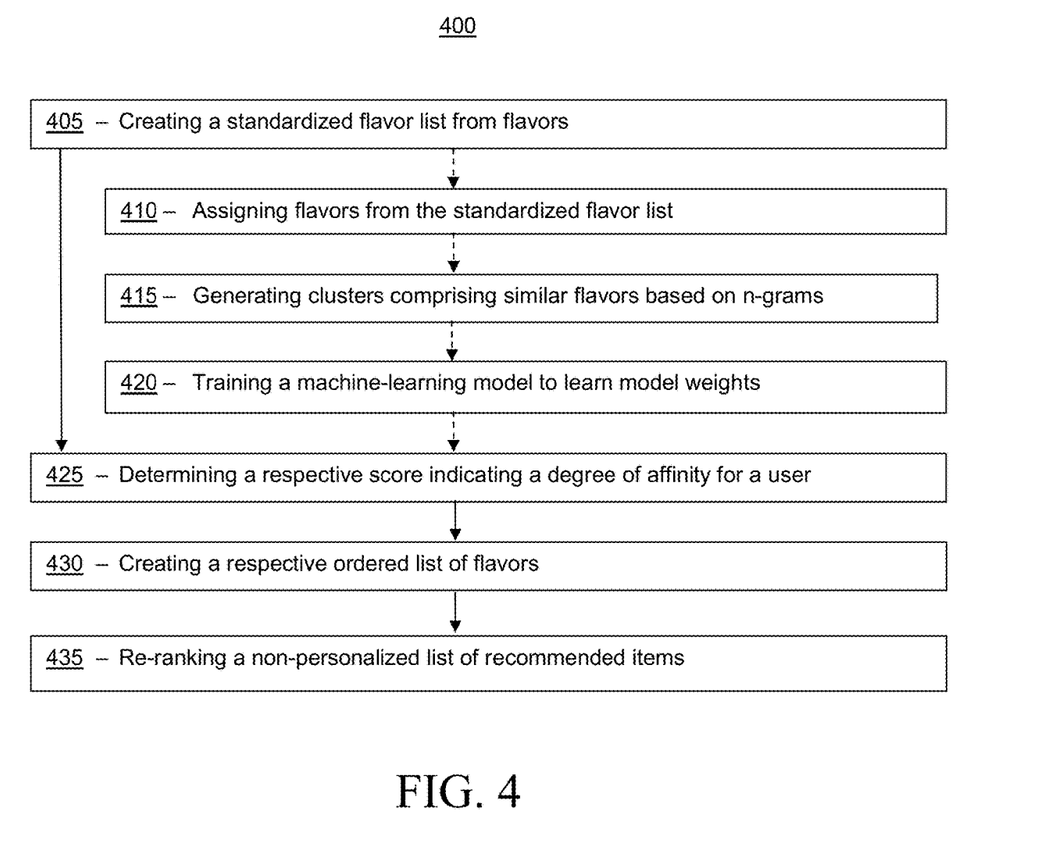
FIG. 4 illustrates a flow chart for a method, according to another embodiment.

Turning ahead in the drawings, FIG. 4 illustrates a flow chart for a method 400, according to another embodiment. In some embodiments, method 400 can be a method of automatically generating personalized flavor recommendations. In many embodiments, determining flavors that are similar can be implemented with a machine learning model. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as omni-channel flavor system 310 (FIG. 3) and/or web server 320 (FIG. 3). The processor(s) can be similar or identical to the processor(s) described above with respect to computer system 100 (FIG. 1).

Referring to FIG. 4, method 400 can include an activity 405 of creating a standardized flavor list from flavors associated with items in a catalog. In many embodiments, items in the catalog can be tagged with flavor attributes or untagged (e.g., without flavor attributes). In some embodiments, even when the flavor attribute for an item is tagged, the value of the flavor attribute associated with the item can be ambiguous, incorrect, and/or another type of mislabeled error. In some cases the value for the flavor attribute of an item can include multiple flavors. In some embodiments, the flavors used associated with the items in activity 405 can be from items that are tagged with flavor data. In various embodiments, activity 405 can be a process of standardizing and/or representing one or more flavor attributes for each item presented in the catalog. In several embodiments, users can be provided with personalized and/or relevant recommendations based on the user's flavor preferences. In a number of embodiments, this process can involve understanding flavor at an item level and using user flavor affinity identification. In various embodiments, the system can use a standardized flavor list for updating tagged flavor data for items and/or tagging untagged items with flavor data based on the standardized flavor list. In some embodiments, activity 405 can be performed as shown in FIG. 5, described below.

Figure 5:
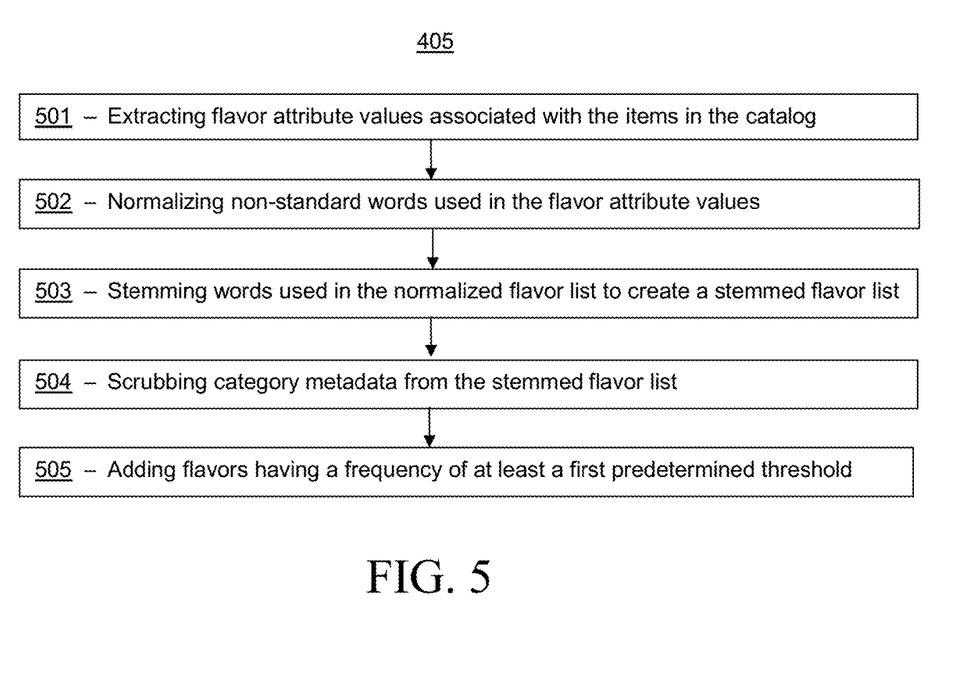
FIG. 5 illustrates a flow chart for an activity of the embodiment of FIG. 4.

Turning ahead in the drawings, FIG. 5 illustrates a flow chart for activity 405 of creating a standardized flavor list from flavors associated with items in a catalog, according to an embodiment. Activity 405 is merely exemplary and is not limited to the embodiments presented herein. Activity 405 can be employed in many different embodiments and/or examples not specifically depicted or described herein. In some embodiments, the procedures, the processes, and/or the activities of activity 405 can be performed in the order presented. In other embodiments, the procedures, the processes, and/or the activities of activity 405 can be performed in any suitable order. In still other embodiments, one or more of the procedures, the processes, and/or the activities of activity 405 can be combined or skipped.

Referring to FIG. 5, activity 405 can include an activity 501 of extracting flavor attribute values associated with the items in the catalog. In some embodiments, extracting flavor attributes can involve collecting the values of flavor attributes for items that are tagged with flavor data, such as items are tagged with flavors by the vendor and/or seller of the item.

In various embodiments, extracting flavor attributes can being the process of standardizing and/or representing one or more flavor attributes for each item presented in the catalog. Such a standardization process can be explained using a running example for several of the activities described below. As a simplified example, a catalog can include the following items A, B, C, D, E, and a global flavor list F' can be extracted, as follows: ["lEmOn aNd LIME", "Lemon'NLime", Chocolate, NULL, "almondchocolate"].

In various embodiments, activity 405 also can include an activity 502 of normalizing non-standard words used in the flavor attribute values to create a normalized flavor list. In some embodiments, the normalization process can take in the flavor list of all the items in the catalog and standardize the flavor list by removing white spaces, replacing special characters etc. So in following the running example described above, global flavor list F' is input and gets processed and comes out as normalized flavor list $F^1$: ["lemonandlime", "lemonnlime", "chocolate", NULL, "almondchocolate"]. Such a normalization process can be performed as shown in Algorithm 1:

ALGORITHM 1

Normalization

INPUT: Global flavor list F' from catalog
OUTPUT: Normalized flavor list $F^1$
procedure NORMALIZATION (F')
    initialize $F^1$
    for each flavor f in F' do
        trim(f)
        lower (f)
        string_replace (f, [' ', ';'],'_')
        string_replace (f, ['0 – 9' '%s'],'')
        $F^1$.add(f)
    end for
end procedure In several embodiments, block 405 additionally can include an activity 503 of stemming words used in the normalized flavor list to create a stemmed flavor list. In various embodiments, stemming words can include identifying root words, remove stop words, etc. In some embodiments, stemming words can process a value of "lemonNlime" so that it can become "lemon lime". In a number of embodiments, when using natural language processing (NLP), words such as "n", "and" etc. can be referred to as "stop words" and can be removed as those words add noise. So in the running example, the normalized list $F^1$ goes in as input, gets tagged and can become stemmed flavors list $F^2$: ["lemon_lime", "lemon lime", "chocolate", NULL, "almondchocolate"]. In several embodiments, activity 503 can be performed as shown in Algorithm 2:

ALGORITHM 2

Stemming

INPUT: Normalized list of flavors $F^1$
OUTPUT: Stemmed flavors $F^2$
procedure STEMMING ($F^1$)
    initialize $F^2$
    for each flavor f in $F^1$ do
        remove_stop_words(f)
        convert to_present_tense (f)
        remove_prefix_and_suffix(f)
        $F^2$. add(f)
    end for
end procedure In some embodiments, activity 405 further can include an activity 504 of scrubbing category metadata from the stemmed flavor list to create a scrubbed flavor list. In several embodiments, scrubbing category metadata can remove metadata-like categories present in the flavor data. For example, the category of item 5 can be "Chocolate" but the current flavor value before scrubbing is "almondchocolate". Here the value "almond" is the actual flavor of the item while "chocolate" was entered to indicate that the item is a chocolate. In such case, chocolate should be the category, not the flavor, and the flavor of "chocolate" was incorrectly tagged in the catalog.

In various embodiments, any value of an item can be labeled as an attribute. In many embodiments, the stemmed flavors list $F^2$ can be scrubbed to remove category information off the list. After scrubbing, the list becomes scrubbed flavor set $F^3$: ["lemon_lime", "lemon_lime", "chocolate", NULL, "almond"]. In various embodiments, activity 504 can be performed as shown in Algorithm 3:

ALGORITHM 3

Scrubbing

INPUT:
1. Normalized, stemmed list of flavors $F^2$
2. Normalized, stemmed set of category information from catalog $C_n$
OUTPUT: Scrubbed flavor set $F^3$
procedure SCRUBBING ($F^2$, $C_n$)
    initialize $F^3$
    for each flavor f in $F^2$ $F^3$ do
        for each category stem c in $C_n$ do
            remove_occurrences(f, c)
        end for
        $F^3$.add(f)
    end for
end procedure In various embodiments, activity 405 also can include an activity 505 of adding flavors having a frequency of at least a first predetermined threshold in the scrubbed flavor list to the standardized flavor list. In several embodiments, after the standardized flavor list has been scrubbed, thresholding can be used to count a frequency of each flavor value across the catalog. In some embodiments, if the frequency meets or exceeds the pre-determined threshold, the flavors can be kept as part of the global standardized flavor list. Continuing with the running example, if the predetermined threshold is 1, then all of the flavors can be retained because they appear at least one time in the catalog. If the threshold is higher, such as 3, then a flavor that occurs once or twice in the catalog would not be included. In various embodiments, scrubbed flavor set $F^3$ from activity 504 can, after thresholding with pre-determined threshold t, become the global standard flavor list F: ["lemon_lime", "lemon_lime", "chocolate", NULL, "almond"]. In some embodiments, activity 505 can be performed a shown in Algorithm 4.

ALGORITHM 4

Thresholding

```
INPUT:
1. Scrubbed flavor set F³
2. Threshold count t
OUTPUT: Results in global standard flavor list F
procedure THRESHOLDING (F³, t)
    initialize F
    for each flavor f in scrubbed set F³ do
        count_number_of_occurrances(F³, f)
        if count ≥ t then
            F .add(f)
        end if
    end for
end procedure
```

Turning back in the drawings to FIG. 4, method 400 also and optionally can include an activity 410 of assigning flavors from the standardized flavor list to the items in the catalog that are associated with the untagged flavor data. In some embodiments, a portion of the items in the catalog can be associated with untagged flavor data. In various embodiments, activity 410 can be performed as shown in FIG. 7, as described below.

Figure 7:
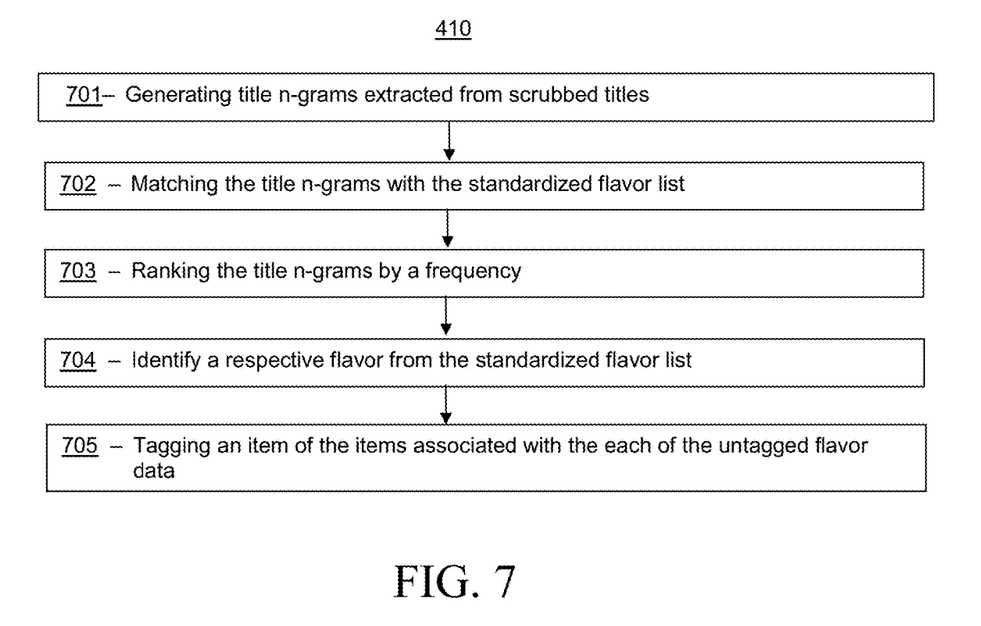
FIG. 7 illustrates a flow chart for an activity of the embodiment of FIG. 4.

Jumping ahead in the drawings, FIG. 7 illustrates a flow chart for activity 410 of assigning flavors from the standardized flavor list to the items in the catalog that are associated with the untagged flavor data, according to an embodiment. Activity 410 is merely exemplary and is not limited to the embodiments presented herein. Activity 410 can be employed in many different embodiments and/or examples not specifically depicted or described herein. In some embodiments, the procedures, the processes, and/or the activities of activity 410 can be performed in the order presented. In other embodiments, the procedures, the processes, and/or the activities of activity 410 can be performed in any suitable order. In still other embodiments, one or more of the procedures, the processes, and/or the activities of activity 410 can be combined or skipped.

Referring to FIG. 7, activity 410 can include an activity 701 of generating title n-grams extracted from scrubbed titles of the items in the catalog that are associated with the untagged flavor data. In several embodiments, once the flavors for the items that were already present in the flavor attribute in a catalog have been extracted and refined, flavors can be assigned to items in which flavor attributes were not tagged, which can involve finding candidate flavor information from the titles of the untagged items in the catalog.

In following with the running example, described above, item D can include a value of "NULL" for a flavor. The item title for item D can be "Acai Lemon Lime health pills". Activity 701 can use a create gram approach, which can generate 1-, 2-, and/or 3-grams from those titles. Continuing the example, the n-grams create in the candidate set T can be as follows: {Acai, Lemon, health, pills, Acai Lemon, Acai Health, Acai Pills, etc}. In various embodiments, activity 701 can be performed as described in Algorithm 5:

ALGORITHM 5

Title n-grams

```
INPUT: Scrubbed list of titles T₁
OUTPUT: Title gram list T
procedure TITLENGRAMS (T₁)
    initialize T
    for each title set tin scrubbed set T₁ do
        initialize G
        for each word t₁ ∈ t do
            create_gram (t₁)
            G.add(gram)
        end for
        for each 2 word combination t₁, t₂ ∈ t do
            create gram(t₁, t₂),
            G.add(gram)
        end for
        for each 3 word combination t₁, t₂, t₃ ∈ t do
            create_gram(t₁, t₂, t₃)
            G.add(gram)
        end for
        T .add(G)
    end for
end procedure
```

In various embodiments, activity 410 also can include an activity 702 of matching the title n-grams with the standardized flavor list. In several embodiments, the candidate set T can be obtained in activity 701. The standardized flavor list can be the global flavor list generated in FIG. 5. In some embodiments, activity 702 can use a matching technique. For example, the value of the flavor list F in the running example is ["lemon_lime", "lemon_lime", "chocolate", NULL, "almond"] and the title grams T for the untagged item D is {Lemon, Lime, Health, Pills, Lemon Lime, etc.}. Activity 702 can match the n-grams with the global flavor list F, which can identify "lemon_lime" from flavor list F as a matching flavor, as it matches 2-gram "Lemon Lime".

In several embodiments, activity 410 additionally can include an activity 703 of ranking the title n-grams by a frequency of matching terms in the standardized flavor list. For example, if there are multiple matches, then the matches can be ranked by popularity (e.g., how often the matches occur).

In some embodiments, activity 410 further can include an activity 704 of identifying a respective flavor from the standardized flavor list matching the each of untagged flavor data based on the ranking. For example, the match that is ranked the highest can be selected as the flavor. In this example, once the ranking is completed, the flavor of "Lemon_Lime" can be identified as the flavor for the untagged item D. In several embodiments, activities 702-704 can be performed as shown in Algorithm 6:

ALGORITHM 6

Rank and Match

```
INPUT:
1.   List of title grams T
2.   Global standard flavor list F
```

ALGORITHM 6-continued

Rank and Match

```
OUTPUT: Tagged flavors list F_t
procedure RANKANDMATCH(T, F)
    initialize F_t
    rank_order_by_frequency(F)
    for each gram set G in T do
        initialize f_i
        for each flavor f in rank_ordered_F do
            if f ∈ G then
                f_i.add(f)
                remove_gram_occurrences(G, f)
            end if
        end for
        F_t.add(f_i)
    end for
end procedure
```

In various embodiments, activity 410 additionally can include an activity 705 of tagging an item of the items associated with the each of the untagged flavor data with the respective flavor identified as matching the each of the untagged flavor data. Continuing the example, once the flavor of "Lemon_Lime" is identified as the flavor for the untagged item D, that flavor can be added as a value for the flavor attribute in the catalog for untagged item D.

Turning back in the drawings to FIG. 4, method 400 additionally and optionally can include an activity 415 of generating clusters comprising similar flavors based on n-grams. In several embodiments, activity 415 can be performed as shown in FIG. 6, as described below.

Figure 6:
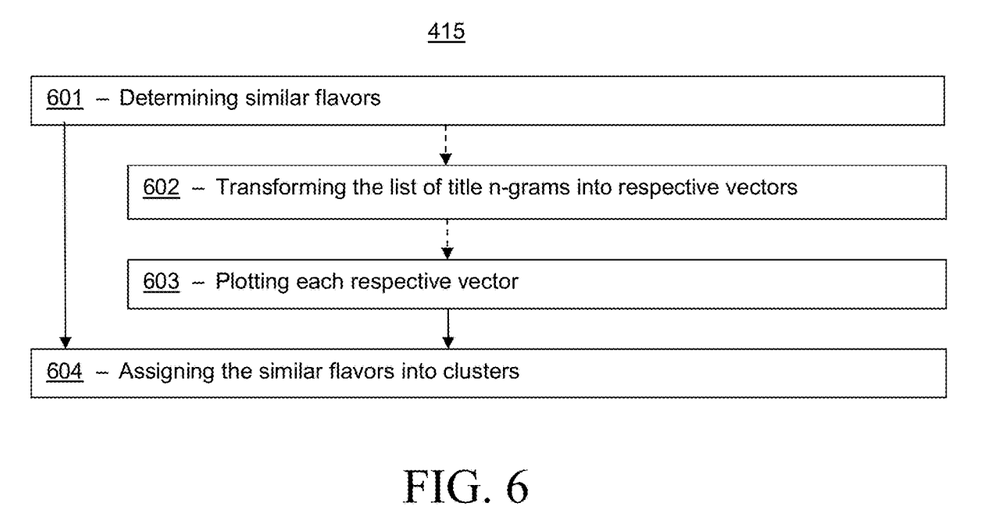
FIG. 6 illustrates a flow chart for an activity of the embodiment of FIG. 4.

Jumping ahead in the drawings, FIG. 6 illustrates a flow chart for activity 415 of generating clusters comprising similar flavors based on n-grams, according to an embodiment. Activity 415 is merely exemplary and is not limited to the embodiments presented herein. Activity 415 can be employed in many different embodiments and/or examples not specifically depicted or described herein. In some embodiments, the procedures, the processes, and/or the activities of activity 415 can be performed in the order presented. In other embodiments, the procedures, the processes, and/or the activities of activity 415 can be performed in any suitable order. In still other embodiments, one or more of the procedures, the processes, and/or the activities of activity 415 can be combined or skipped.

Referring to FIG. 6, activity 415 can include an activity 601 of determining similar flavors based on word structures of titles of the list of title n-grams. In a number of embodiments, activity 601 can include an activity 602 of transforming the list of title n-grams into respective vectors representing each flavor of the standardized flavor list. In some embodiments, the global standardized flavor list F can be used to create n-grams that can be put in a feature space. For example, the flavor list can include flavors of Strawberry, Blueberry, Chocolate, Vanilla, Lime, and 5-grams can be used to represent each word. In this example, Strawberry can become the vector Straw, trawb, rawbe, awber, wberr, berry. Blueberry can become the vector Blueb, luber, uberr, berry. The other flavors can be made into 5-grams similarly.

In many embodiments, activity 601 also can include an activity 603 of plotting each respective vector. For example, the vectors generated in activity 602 can be plotted, with each flavor can representing one vector.

In various embodiments, activity 415 further can include an activity 604 of assigning the similar flavors into clusters. In some embodiments, a clustering algorithm (e.g., k-means clustering) can be used to identify similar flavors based on the plot of the vectors and how the vectors representing the flavors are clustered together. In various embodiments, activities 601-604 can be performed as shown in Algorithm 7:

ALGORITHM 7

Clustering n-Grams

```
INPUT: List of Grams T, Global Flavor List F
OUTPUT: List of Flavors with clusters assigned to them (F_c)
procedure CLUSTERING(T, F)
    Assign k initial centroids C = {c_1, c_2 ... c_k}
    Initialize F_c, with random cluster membership
    while δ ≠ Φ do
        for f ∈ F do
            Assign cluster f_c such that CosineSim(F, c_i) is maximized
            C_new ← RecomputeCentroids(C)
            δ ← SetDiff(C_new, C)
        end for
    end while
end procedure
```

Turning back to the drawings FIG. 4, method 400 further and optionally can include an activity 420 of training a machine-learning model to learn model weights for each time slot of historical data for the each of the one or more item types. In several embodiments, the machine-learning model comprises logistic regression.

In various embodiments, activity 420 of training a machine-learning model to learn model weights for each time slot of historical data for the each of the one or more item types also can include using historical data. The historical data can include a number of transactions, a number of views, and a number of adds-to-cart items performed by a user for the each of the one or more item types.

In many embodiments, training the machine learning mode can include learning model weights for each time slot for each product type. As an example, time slot of historical data for a user can extend over a 12-month period from February 2019 to January 2020, and can be categorized into 12 time slot, one for each month. The 12 time slot can be used in training the machine learning model by the first 11 time slot being used inputs to the machine-learning model and the last time slot being used as an output of the machine-leaning model. For example, the training data set for flavors of yogurt can include the following input time slot:

February 2019:
   Vanilla: 3 views,
   Plain: 1 transaction, 5 views
   Strawberry: 1 add-to-cart (ATC), 2 views
March 2019:
   Vanilla: 6 views
   Plain 1 ATC, 4 views
   Strawberry: 10 views
. . . (many time slot omitted for simplicity)
December 2019:
   Vanilla: 2 transactions, 1 view
   Plain: 2 views
   Strawberry: 4 transactions, 3 views The following time slot can be used to predict the transaction probability as the next time slot in a given product type, which indicates transactions that occurred during the time slot, and which can be used as "output" to train the model:

January 2020
   Vanilla: 0
   Plain: 1
   Strawberry: 1.

Figure 8:
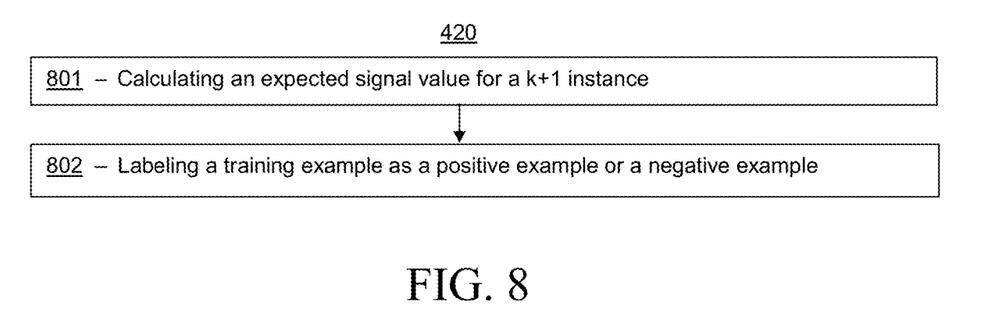
FIG. 8 illustrates a flow chart for an activity of the embodiment of FIG. 4.

In various embodiments, activity 420 can be performed at least in part as shown in FIG. 8, as described below, in order to determine whether or not an example in the "output" set is a positive example.

Jumping ahead in the drawings, FIG. 8 illustrates a flow chart for activity 420 of training a machine-learning model to learn model weights for each time slot of historical data for the each of the one or more item types, according to an embodiment. Activity 420 is merely exemplary and is not limited to the embodiments presented herein. Activity 420 can be employed in many different embodiments and/or examples not specifically depicted or described herein. In some embodiments, the procedures, the processes, and/or the activities of activity 420 can be performed in the order presented. In other embodiments, the procedures, the processes, and/or the activities of activity 420 can be performed in any suitable order. In still other embodiments, one or more of the procedures, the processes, and/or the activities of activity 420 can be combined or skipped.

In several embodiments, activity 420 can include an activity 801 of calculating an expected signal value for a k+1 instance. In several embodiments, a training set can be constructed using customer signal data. In some embodiments, the customer signal data can utilize different signals, signal weights and/or temporal weights. For example, a customer signal Matrix X for a customer c on flavor can be expressed:

$$f \begin{bmatrix} 3 & 7 & 4 & 5 \\ 4 & 2 & 1 & 4 \\ 1 & 5 & 7 & 3 \end{bmatrix}$$

In some embodiments, the rows can signify action types and the columns can signify a period of time, such as a week, a month, and/or another suitable time period. In several embodiments, the system can consider a first k months for training data when the data can include k+1 months of data. In this example, a time period of 4 months is used for training, such as January, February, March, and April. In the above example, 3 action types are represented by each row. For example, the views of the flavor f for April can be found on a 1st row in the matrix and a 4th column (e.g., April), thus finding the value 5. If that value is greater than a threshold, such as 0.5, the flavor can be counted as a one label.

Consider the following matrix of user signals X:

$$X = \begin{bmatrix} x_{11} & \cdots & x_{1k} \\ \cdots & \cdots & \cdots & \cdots & x_{jk} \end{bmatrix},$$

a set of temporal weights, $W_t = \{w_{m1}, w_{m2} \ldots w_{mk}\}$, a set of action weights, $W_\alpha = \{w_{\alpha 1}, w_{\alpha 2} \ldots w_{\alpha j}\}$. The expected signal value can be calculated for the k+1th instance $\exp_{x_{k+1}}$ as follows:

$$\exp_{x_{k+1}} = \frac{(W_t \times X^T) \cdot W_\alpha}{\|(W_t \times X^T)\|_2^2 \|W_\alpha\|_2^2}$$

In various embodiments, activity 420 also can include an activity 802 of labeling a training example as a positive example or a negative example based on a binarization formula using the expected signal value. In some embodiments, labeling an example as a positive example can be determined using the binarization formula expressed as follows:

$$\text{Label} = \begin{cases} 1, & \exp_{x_{k+1}} \leq 0.5 \\ 0, & \text{otherwise} \end{cases}$$

0.5 is a threshold, which can be configured. In many embodiments, more weight can be given to more recent transactions. In some embodiments, more weight can be given to a transaction by a user compared to an add-to-cart (ATC) user action. In several embodiments, more weight can be given to an add-to cart user action compared to a view or a browse user action.

For example, let the weights for {Jan, Feb, Mar, Apr} be $W_t$: {1, 2, 3, 4} (more weight for more recent), and let the weights for {View, ATC and Transaction} be 1, 2, 3. Applying the formula with X, $W_t$, $W_\alpha$, results in a value of 0.88. In many embodiments, a result which is greater than threshold 0.5 can indicate a positive sample. In a number of embodiments, the labeling approach can be used to learn the weights for the features using logistic regression.

Turning back in the drawings to FIG. 4, method 400 additionally can include an activity 425 of determining a respective score indicating a degree of affinity for a user for each flavor of each of one or more item types associated with the items. In some embodiments, the respective score for each flavor can be determined using the machine-learning model, as trained. Given a feature set for a new user, and a flavor pair, the affinity of the value for that user can be calculated for that flavor. In many embodiments, flavor affinities for the user can be different for different product types.

In a number of embodiments, model weights learned during training can indicate customer affinities and predictions. For example, the logistic regression model can use a sigmoid function:

$$\text{sigmoid}(x) = \frac{1}{1+e^{-x}} = \frac{1}{1+e^{-(b_0+b_1 x_1+b_2 x_2+b_3 x_3 \ldots b_n x_n)}}$$

where $b_0, b_1, \ldots b_n$ refer to various parameters for the model weights and $x_1, x_2 \ldots x_n$ refers to features. For example, such features can include temporal user actions.

In many embodiments, the machine-learning model can be used to predict the transaction probability for a next time slot, given previous time slots. For example, given previous time slots March 2019-January 2020, the machine-learning model can be used to predict the transaction probability for the next time slot, February 2020, can be predicted to be the following:

February 2020
  Vanilla: 0.3456
  Plain: 07845
  Strawberry: 0.5312

In some embodiments, method 400 also can include an activity 430 of creating a respective ordered list of flavors for each of the one or more item types for the user in which the respective ordered list of flavors are ranked by the respective score for the each flavor in the ordered list. For example, in the Cheeses product type, the flavor affinity for a user can be determined to be the following list:

1. Mozzarella
2. Cheddar
3. Parmesan

In the Yogurts product type, the flavor affinity for the user can be determined to be the following list:
1. Raspberry
2. Strawberry
3. Chocolate Haze Craze
4. Vanilla In many embodiments, the flavor affinities for the user can be used to personalize similar item recommendations for the user, as described below in connection with activity 435.

In several embodiments, method 400 can include an activity 435 of re-ranking a non-personalized list of recommended items associated with an anchor item of the items using the respective ordered list of flavors for the user. In some embodiments, ranking similar items non-personalized can be expressed:

$$y = f(\text{relevance score})$$

For example, if a user selects an anchor item of Yoplait Strawberry yogurt, a non-personalized list of recommended items can include 5 yogurt flavors in a order: original strawberry banana, French vanilla, harvest peach, low-fat vanilla, and blueberry.

In several embodiments, ranking similar items personalized to a user can be expressed as:

$$y = f(\text{relevance score}, \text{flavor score})$$

$$y = w_1 \times \text{relevance score} + w_2 \times \text{flavor score}$$

In many embodiments, applying a personalization layer to the non-personalized list of recommended items can use the same list of items recommended and changes the order based on the flavor preference of the user. For example, a personalized list of recommended items can re-rank the flavor preference of the user to the following order: original strawberry banana, French vanilla, low-fat vanilla, harvest peach, blueberry.

In various embodiments, two types of models in most item recommender systems can include: upsell model and cross sell models. In some embodiments, upsell models can provide recommendations as close to the original item as possible. In several embodiments, an evaluation metric can be depend on a family of upsell models. In various embodiments, an advantage of using an omni-channel flavor system can be an increase accuracy in matching flavors of recommendations in an upsell model.

As an example, an upsell model 1 can have an anchor item A: with recommendations $r_1, r_2, r_3$. In some embodiments, evaluating two identification systems for accuracy can include a flavor identification system $F^1$ (e.g., a baseline) and $F^2$ (Omni-channel flavor system). Let the flavor of A (as identified by both $F^1$ and $F^2$ be "Strawberry"). Let the recommendations include $\{r_1, r_2, r_3\}$ that can include the flavor values:
1. A flavor of strawberry identified by $F^1$ can include the following values: {"strawberry", "strbry", "NULL"}.
2. A flavor of strawberry identified by $F^2$ can include "strawberry", "strawberry", "strawberry".

Let clickthrough rates of $\{r_1, r_2, r_3\}$ be $\{0.8, 0.1, 0.5\}$, respectively. In this example, performing a simple match and taking the clickthrough rate as the relevance score can result in the values $\{0.8, 0, 0\}$ for $F^1$ and $\{0.8, 0.1, 0.5\}$ for $F^2$. In some embodiments, such lists can be used to compute metrics, such as normalized discounted cumulative gain (NDCG), monthly recurring revenue (MRR), and/or another metrics. In some embodiments, evaluations of recommender systems can be performed over multiple upsell models, such as $S_1$, $S_2$, etc. A mean of the metrics can be used as a total score. In several embodiments, the total score can be determined as shown in Algorithm 8

ALGORITHM 8

Evaluation Metric

INPUT: Family of Upsell Recommenders : $\{S_1, S_2....S_n\}$
flavor extraction model F : $\{F_1, F_2 ... F_m\}$
OUTPUT: List of Eval Metrics: metrics
    procedure EVALMETRIC (S, F)
        for s ∈ S do
            C(s) ← the set of anchor items for a recommender model
            for a ∈ C(S) do
                R(a) ← the set of recommendations for the anchor item a
                for r in R(a) do
                    rel(a,r) ← 1 iff f(r) == f(a) such that f ∈ F
                end for
            end for
            Get NDCG(s),MRR(s),MAP(s)
        end for
        metrics ← Avg(NDCG(s)), Avg (MRR(S)), Avg. (MAP(S))∀s ∈ S
    end procedure In several embodiments, an advantage of using the system can include new flavor predictions. For example, omni-channel flavor system 310 also can be used to learn the weights for features using logistic regression. Given a feature set for a new customer and flavor pair, the system can calculate an affinity of the value of a flavor for that customer.

Turning to the next drawing, FIG. 3 illustrates a block diagram of omni-channel flavor system 310. Omni-channel flavor system 310 is merely exemplary and is not limited to the embodiments presented herein. Omni-channel flavor system 310 can be employed in many different embodiments or examples not specifically depicted or described herein. In some embodiments, certain elements or systems of omni-channel flavor system 310 can perform various procedures, processes, and/or acts. In other embodiments, the procedures, processes, and/or acts can be performed by other suitable elements or systems. In many embodiments, the systems of omni-channel flavor system 310 can be modules of computing instructions (e.g., software modules) stored at non-transitory computer readable media. In other embodiments, the systems of omni-channel flavor system 310 can be implemented in hardware.

In many embodiments, omni-channel flavor system 310 can include a communication system 311. In a number of embodiments, communication system 311 can at least partially perform activity 501 (FIG. 5) of extracting flavor attribute values associated with the items in the catalog.

In several embodiments, omni-channel flavor system 310 also can include an assignment system 312. In various embodiments, assignment system 312 can at least partially perform activity 410 (FIG. 4) of assigning flavors from the standardized flavor list to the items in the catalog that are associated with the untagged flavor data, activity 601 (FIG. 6) of determining similar flavors within a similarity matrix based on word structures of titles of the list of title n-grams, activity 603 of plotting each respective vector, activity 604 (FIG. 6) of assigning the similar flavors into clusters, and/or activity 705 (FIG. 7) of generating title n-grams extracted from scrubbed titles of the items in the catalog that are associated with the untagged flavor data.

In many embodiments, omni-channel flavor system 310 further can include an N-gram system 313. In several embodiments, N-gram system 313 can at least partially perform activity 415 (FIG. 4) of generating clusters comprising similar flavors based on n-grams, activity 602 (FIG. 6) of transforming the list of title n-grams into respective vectors representing each flavor of the standardized flavor list, activity 701 (FIG. 7) of generating title n-grams extracted from scrubbed titles of the items in the catalog that are associated with the untagged flavor data, activity 702 (FIG. 7) of matching the title n-grams with the standardized flavor list, activity 703 (FIG. 7) of ranking the title n-grams by a frequency of matching terms in the standardized flavor list, and/or activity 704 (FIG. 7) of tagging an item of the items associated with the each of the untagged flavor data with the respective flavor identified as matching the each of the untagged flavor data.

In several embodiments, omni-channel flavor system 310 additionally can include a standardization system 314. Standardization system 314 can at least partially perform activity 405 (FIG. 4) of creating a standardized flavor list from flavors associated with items in a catalog, activity 502 (FIG. 5) of normalizing non-standard words used in the flavor attribute values to create a normalized flavor list, activity 503 (FIG. 5) of stemming words used in the normalized flavor list to create a stemmed flavor list, activity 504 (FIG. 5) of scrubbing category metadata from the stemmed flavor list to create a scrubbed flavor list, and/or activity 505 (FIG. 5) of adding flavors having a frequency of at least a first predetermined threshold in the scrubbed flavor list to the standardized flavor list.

In various embodiments, omni-channel flavor system 310 additionally can include a ranking system 315. Ranking system 315 can at least partially perform activity 425 (FIG. 4), of determining a respective score indicating a degree of affinity for a user for each flavor of each of one or more item types associated with the items, activity 430 (FIG. 4) of creating a respective ordered list of flavors for each of the one or more item types for the user in which the respective ordered list of flavors are ranked by the respective score for the each flavor in the ordered list, and/or activity 435 (FIG. 4) of re-ranking a non-personalized list of recommended items associated with an anchor item of the items using the respective ordered list of flavors for the user.

In various embodiments, omni-channel flavor system 310 additionally can include a machine-learning system 316. Machine-learning system 316 can at least partially perform activity 420 (FIG. 4) of creating a respective ordered list of flavors for each of the one or more item types for the user in which the respective ordered list of flavors are ranked by the respective score for the each flavor in the ordered list, activity 801 (FIG. 8) of calculating an expected signal value for a k+1 instance, and/or activity 802 (FIG. 8) of labeling a training example as a positive example or a negative example based on a binarization formula using the expected signal value.

In several embodiments, web server 320 can display webpages, mobile application screens, and/or other pages to the user.

In a number of embodiments, the techniques described herein can advantageously provide a consistent user experience by dynamically updating product information with derived attributes for each item using a centralized ecosystem, such as omni-channel flavor system 310 (FIG. 3) across different applications that query this information, such as product information, existing rules, etc. In various embodiments, the techniques described herein can dynamically determine a correct flavor attribute of an item based on a standardized flavor list that can be used to match a flavor attribute for an untagged item. For example, over two million product updates can be received from third-party vendors in one day. In some embodiments, the techniques provided herein can beneficially reduce computing resources and costs while continuing to offer real time updates for the items (e.g., products) received each second, minute, and/or other suitable period of time in at least a day, a week, and/or other suitable periods of time. For example, a catalog can include approximately one hundred million items and/or products at any given period of time.

In many embodiments, the techniques described herein can be used continuously at a scale that cannot be handled using manual techniques. For example, the number of daily and/or monthly visits to the webpage can exceed approximately ten million and/or other suitable numbers and/or the number of products and/or items sold on the website can exceed approximately ten million (10,000,000) approximately each day.

In a number of embodiments, the techniques described herein can solve a technical problem that arises only within the realm of computer networks, as determining a flavor to tag an untagged item based on the standardized flavor list to automatically update a product with certain flavor attributes does not exist outside the realm of computer networks. Moreover, the techniques described herein can solve a technical problem that cannot be solved outside the context of computer networks.

Various embodiments can include a system including one or more processors and one or more non-transitory computer-readable media storing computing instructions configured to run on the one or more processors and perform certain acts. The acts can include creating a standardized flavor list from flavors associated with items in a catalog. The acts also can include determining a respective score indicating a degree of affinity for a user for each flavor of each of one or more item types associated with the items. The acts additionally can include creating a respective ordered list of flavors for each of the one or more item types for the user in which the respective ordered list of flavors are ranked by the respective score for the each flavor in the ordered list. The acts further can include re-ranking a non-personalized list of recommended items associated with an anchor item of the items using the respective ordered list of flavors for the user.

A number of embodiments can include a method being implemented via execution of computing instructions configured to run at one or more processors and stored at one or more non-transitory computer-readable media. The method can include creating a standardized flavor list from flavors associated with items in a catalog. The method further can include determining a respective score indicating a degree of affinity for a user for each flavor of each of one or more item types associated with the items. The method also can include creating a respective ordered list of flavors for each of the one or more item types for the user in which the respective ordered list of flavors are ranked by the respective score for the each flavor in the ordered list. The method additionally can include re-ranking a non-personalized list of recommended items associated with an anchor item of the items using the respective ordered list of flavors for the user.

Although automatically generating personalized flavor preferences has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 4-8 may include different procedures, processes, and/or activities and be performed by many different modules, in many different orders, and/or one or more of the procedures, processes, or activities of FIGS. 4-8 may include one or more of the procedures, processes, or activities of another different one of FIGS. 4-8. As another example, the systems within omni-channel flavor system 310 (FIG. 3) and/or web server 320 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents

What is claimed is:

1. A system comprising:
    one or more processors; and
    one or more non-transitory computer-readable media storing computing instructions that, when executed on the one or more processors, cause the one or more processors to perform functions comprising:
        creating a standardized flavor list from flavors associated with items in a catalog, wherein creating the standardized flavor list comprises:
            extracting flavor attribute values associated with the items in the catalog;
            normalizing non-standard words used in the flavor attribute values to create a normalized flavor list;
            stemming words used in the normalized flavor list to create a stemmed flavor list;
            scrubbing category metadata from the stemmed flavor list to create a scrubbed flavor list; and
            adding flavors having a first frequency of at least a first predetermined threshold in the scrubbed flavor list to the standardized flavor list;
        determining a respective score indicating a degree of affinity for a user for each flavor of each of one or more item types associated with the items;
        creating a respective ordered list of flavors for each of the one or more item types for the user in which the respective ordered list of flavors are ranked by the respective score for each flavor in the respective ordered list of flavors; and
        re-ranking a non-personalized list of recommended items associated with an anchor item of the items using the respective ordered list of flavors for the user.

2. The system of claim 1, wherein creating the standardized flavor list further comprises:
    after the standardized flavor list has been scrubbed, counting, using thresholding, a respective second frequency of each flavor value across the catalog, wherein when the respective second frequency meets or exceeds a second predetermined threshold, retaining the flavor value associated with the respective second frequency as part of a global standardized flavor list.

3. The system of claim 1, wherein the computing instructions, when executed on the one or more processors, further cause the one or more processors to perform functions comprising:
    generating clusters comprising similar flavors based on n-grams, comprising:
        determining the similar flavors based on word structures of titles of a list of title n-grams, by:
            transforming the list of title n-grams into respective vectors representing each flavor of the standardized flavor list; and
            plotting each respective vector; and
        assigning the similar flavors into clusters.

4. The system of claim 3, wherein determining the similar flavors is further based on a k-means clustering algorithm.

5. The system of claim 1, wherein a portion of the items in the catalog are associated with untagged flavor data.

6. The system of claim 5, wherein the computing instructions, when executed on the one or more processors, further cause the one or more processors to perform functions comprising:
    assigning flavors from the standardized flavor list to the items in the catalog that are associated with the untagged flavor data, comprising:
        generating title n-grams extracted from scrubbed titles of the items in the catalog that are associated with the untagged flavor data;
        matching the title n-grams with the standardized flavor list;
        ranking the title n-grams by a frequency of matching terms in the standardized flavor list;
        identifying a respective flavor from the standardized flavor list matching each untagged flavor data based on the ranking; and
        tagging an item of the items associated with each untagged flavor data with the respective flavor identified as matching each of the untagged flavor data.

7. The system of claim 1, wherein the computing instructions, when executed on the one or more processors, further cause the one or more processors to perform a function comprising:
    training a machine-learning model to learn model weights for each time slot of historical data for each of the one or more item types,
    wherein:
        each respective time slot of the historical data comprises respective data for the respective time slot; and
        the respective data comprise a respective number of transactions, a respective number of views, and a respective number of adds-to-cart items performed by a respective user for each of the one or more item types during the respective time slot.

8. The system of claim 7, wherein the machine-learning model comprises logistic regression.

9. The system of claim 7, wherein training the machine-learning model further comprises:
   calculating an expected signal value for a k+1 instance; and
   labeling a training example as a positive example or a negative example based on a binarization formula using the expected signal value.

10. The system of claim 7, wherein the respective score for each flavor is determined using the machine-learning model, as trained.

11. A method being implemented via execution of computing instructions configured to run on one or more processors and stored at one or more non-transitory computer-readable media, the method comprising:
   creating, via the one or more processors, a standardized flavor list from flavors associated with items in a catalog, wherein creating the standardized flavor list comprises:
      extracting flavor attribute values associated with the items in the catalog;
      normalizing non-standard words used in the flavor attribute values to create a normalized flavor list;
      stemming words used in the normalized flavor list to create a stemmed flavor list;
      scrubbing category metadata from the stemmed flavor list to create a scrubbed flavor list; and
      adding flavors having a first frequency of at least a first predetermined threshold in the scrubbed flavor list to the standardized flavor list;
   determining, via the one or more processors, a respective score indicating a degree of affinity for a user for each flavor of each of one or more item types associated with the items;
   creating, via the one or more processors, a respective ordered list of flavors for each of the one or more item types for the user in which the respective ordered list of flavors are ranked by the respective score for each flavor in the respective ordered list of flavors; and
   re-ranking, via the one or more processors, a non-personalized list of recommended items associated with an anchor item of the items using the respective ordered list of flavors for the user.

12. The method of claim 11, wherein creating, via the one or more processors, the standardized flavor list further comprises:
   after the standardized flavor list has been scrubbed, counting, using thresholding, a respective second frequency of each flavor value across the catalog, wherein when the respective second frequency meets or exceeds a second pre-determined threshold, retaining the flavor value associated with the respective second frequency as part of a global standardized flavor list.

13. The method of claim 11, further comprising:
   generating, via the one or more processors, clusters comprising similar flavors based on n-grams, comprising:
      determining the similar flavors based on word structures of titles of a list of title n-grams, by:
         transforming the list of title n-grams into respective vectors representing each flavor of the standardized flavor list; and
         plotting each respective vector; and
      assigning the similar flavors into clusters.

14. The method of claim 13, wherein determining the similar flavors is further based on a k-means clustering algorithm.

15. The method of claim 11, wherein a portion of the items in the catalog are associated with untagged flavor data.

16. The method of claim 15, further comprising:
   assigning, via the one or more processors, flavors from the standardized flavor list to the items in the catalog that are associated with the untagged flavor data, comprising:
      generating title n-grams extracted from scrubbed titles of the items in the catalog that are associated with the untagged flavor data;
      matching the title n-grams with the standardized flavor list;
      ranking the title n-grams by a frequency of matching terms in the standardized flavor list;
      identifying a respective flavor from the standardized flavor list matching each untagged flavor data based on the ranking; and
      tagging an item of the items associated with each untagged flavor data with the respective flavor identified as matching each untagged flavor data.

17. The method of claim 11, further comprising:
   training, via the one or more processors, a machine-learning model to learn model weights for each time slot of historical data for each of the one or more item types,
   wherein:
      each respective time slot of the historical data comprises respective data for the respective time slot; and
      the respective data comprise a respective number of transactions, a respective number of views, and a respective number of adds-to-cart items performed by a respective user for each of the one or more item types during the respective time slot.

18. The method of claim 17, wherein the machine-learning model comprises logistic regression.

19. The method of claim 17, wherein training, via the one or more processors, the machine-learning model further comprises:
   calculating an expected signal value for a k+1 instance; and
   labeling a training example as a positive example or a negative example based on a binarization formula using the expected signal value.

20. The method of claim 17, wherein the respective score for each flavor is determined using the machine-learning model, as trained.

* * * * *